United States Patent
Sakamoto et al.

(10) Patent No.: US 6,528,747 B2
(45) Date of Patent: Mar. 4, 2003

(54) ACCELERATION DETECTOR WITH SPRING BIASED ROTOR

(75) Inventors: Kazunori Sakamoto, Chiryu (JP); Yoshiyuki Ito, Anjo (JP); Takeki Kawamura, Inazawa (JP); Koichi Fujita, Toyota (JP); Satoru Taniguchi, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/826,892

(22) Filed: Apr. 6, 2001

(65) Prior Publication Data

US 2002/0056624 A1 May 16, 2002

(30) Foreign Application Priority Data

Apr. 6, 2000 (JP) ........................................ 2000-104908

(51) Int. Cl.$^7$ .............................................. H01H 35/14
(52) U.S. Cl. ............................. 200/61.45 R; 200/61.48
(58) Field of Search .................. 200/61.45 R, 61.45 M, 200/61.46–61.53

(56) References Cited

U.S. PATENT DOCUMENTS 3,183,724 A * 5/1965 McQuillen ............... 200/61.46
4,362,913 A * 12/1982 Kumita et al. ........ 200/61.45 R
5,670,764 A * 9/1997 Sakamoto et al. .... 200/61.45 R
6,093,898 A 7/2000 Sakamoto et al.
6,170,864 B1 1/2001 Fujita et al.
6,172,313 B1 * 1/2001 Sakamoto et al. .... 200/61.45 R

FOREIGN PATENT DOCUMENTS

| JP | 10-152014 A | 6/1998 |
| JP | 11-174081 A | 7/1999 |
| JP | 11-174082 A | 7/1999 |
| JP | 11-174083 A | 7/1999 |

* cited by examiner

*Primary Examiner*—J. R. Scott
(74) *Attorney, Agent, or Firm*—Burns, Doane, Swecker & Mathis, LLP

(57) ABSTRACT

An acceleration detector comprising a rotor rotatably supported within a housing and rotating against the urging force of a torsion spring based on acceleration, a pair of contact terminals contacting each other to be in an electrically connected state by rotation of the rotor at an inner end portion provided within the housing, and a supporting portion integrally formed with the rotor and supporting the torsion spring. The supporting portion is displaced by a predetermined amount in a predetermined direction from the rotary center of the rotor so that the spring effect center when torque is exerted on the torsion spring by rotation of the rotor substantially corresponds to the rotary center of the rotor. This construction of the acceleration detector produces the desired performance approximating the design value in an acceleration detector.

9 Claims, 18 Drawing Sheets

ACCELERATION DETECTOR WITH SPRING BIASED ROTOR

BACKGROUND OF THE INVENTION

1. Field of the Invention

The invention relates to an acceleration detector which detects acceleration generated by an impact of, for example, a vehicle collision and is utilized as a switch for activating a crash safety device such as an air bag of vehicles.

2. Description of Related Art

One of acceleration detector comprises a rotor which is rotatably supported within a housing and rotates according to acceleration, and a pair of contact terminals contacting with each other by rotation of the rotor at an inner end portion provided within the housing to be in an electrically connected state. An example of this type of detector is shown in Japanese Patent Laid-Open Publication No. Hei 11-174081.

In the acceleration detector shown in the above-mentioned publication, a rotor is rotatably assembled through a shaft, and a coil-like torsion spring urging the rotor to an initial position is assembled with a required gap to a cylindrical collar assembled on the shaft. Moreover, the inner end portion of the contact terminal is elastically and repulsively engaged with a cam portion provided to the rotor, and pressed and moved by rotation of the rotor against urging force of the torsion spring.

In the acceleration detector of the above-mentioned publication, the torsion spring which is supported by the collar installed on the shaft has disadvantages in terms of costs. In addition, since the spring effect center of the coil-like torsion spring and the rotary center of the rotor are displaced at least by the amount corresponding to the gap in the radial direction, the urging force to the rotor by the torsion spring may deviate from a desired value or design value, and a desired performance cannot be obtained. Moreover, edges at both sides of the inner end portions in the contact terminals may damage the cam portion when the rotor rotates at an engagement portion of the cam portion provided to the rotor and the inner end portion of the contact terminal, resulting in a risk that the desired performance cannot be obtained since the slide resistance between them is unstable.

SUMMARY OF THE INVENTION

It is an object of the invention to obtain the desired performance approximating the design value in an acceleration detector. According to a first aspect of the invention, the acceleration detector comprises a rotor rotatably supported within a housing and rotating against urging force of a torsion spring according to acceleration, a pair of contact terminals contacting with each other to be in an electrically connected state by rotation of the rotor at an inner end portion provided within the housing, and a supporting portion integrally formed with the rotor and supporting the torsion spring, the supporting portion being displaced by a predetermined amount in a predetermined direction from the rotary center of the rotor so that the spring effect center when torque is exerted on the torsion spring by rotation of the rotor substantially corresponds to the rotary center of the rotor.

The acceleration detector according to the first aspect of the invention enables reduction of the costs since the supporting portion is integrally formed with the rotor and supports the torsion spring. Moreover, the supporting portion is displaced by the predetermined amount in the predetermined direction from the rotary center of the rotor so that the spring effect center when torque is exerted on the torsion spring by the rotation of the rotor substantially corresponds to the rotary center of the rotor, whereby, the desired urging force, approximating the design value, of the torsion spring is applied to the rotating rotor to obtain the desired performance.

Moreover, the acceleration detector according to the second aspect of the invention comprising the rotor rotatably supported within the housing and rotating according to acceleration and a pair of the contact terminals being pressed by the cam portion rotating integrally with the rotor at the inner end portion provided within the housing and contacting to each other to be in an electrically connected state is characterized in that the width of the inner end portion of the contact terminals pressed and moved by the cam portion is formed larger than that of the cam portion and edges at both sides of the inner end portion of the contact terminals are arranged so as not to be engaged with the cam portion.

In the acceleration detector according to the second aspect of the invention, the width of the inner end portion of the contact terminals pressed and moved by the cam portion is formed larger than that of the cam portion, so that edges at both sides of the inner end portion of the contact terminals are arranged so as not to be engaged with the cam portion; therefore, when the rotor rotates, the edges at the both sides of the inner end portion in the contact terminals do not damage the cam portion in the engagement portion of the cam portion rotating integrally with the rotor and the inner end portion of the contact terminals and the slide resistance between them can be stabilized. Accordingly, the desired performance can be obtained.

DETAILED DESCRIPTION OF PREFERRED EMBODIMENT

Figure 1:
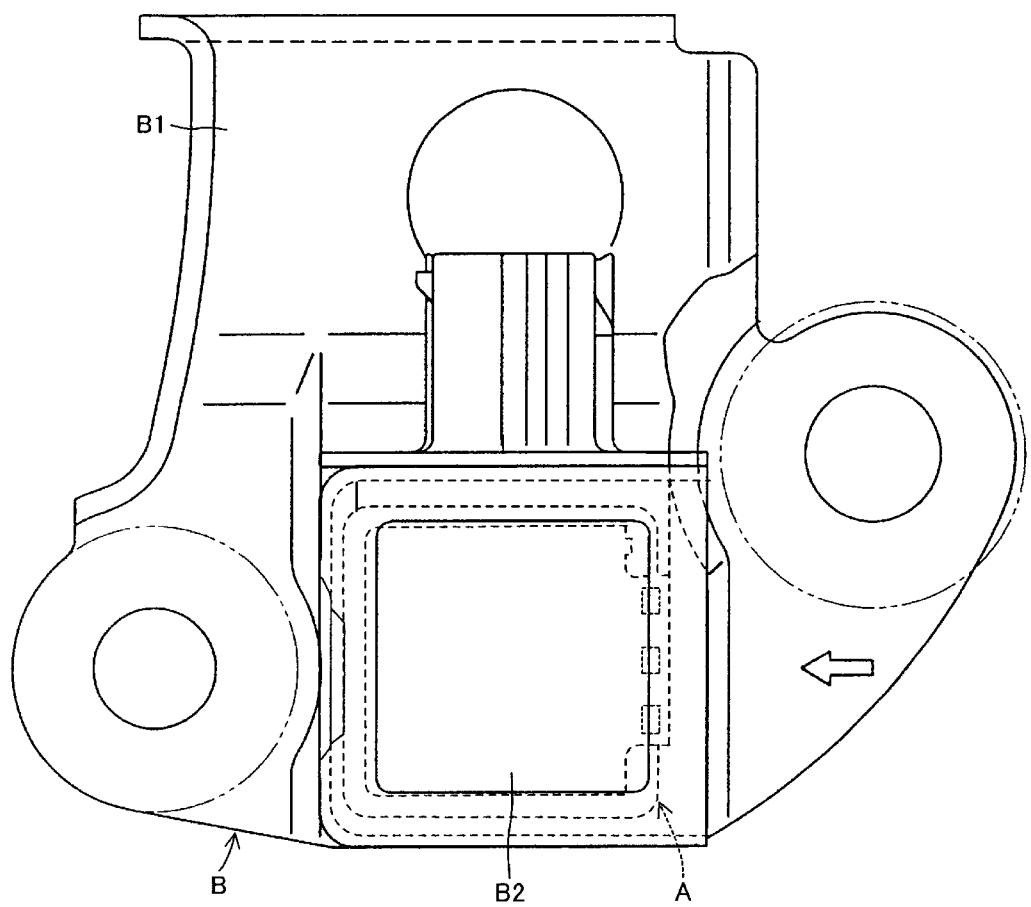
FIG. 1 is a side view of the acceleration detector according to the invention in an assembled state to a bracket.
Figure 2:
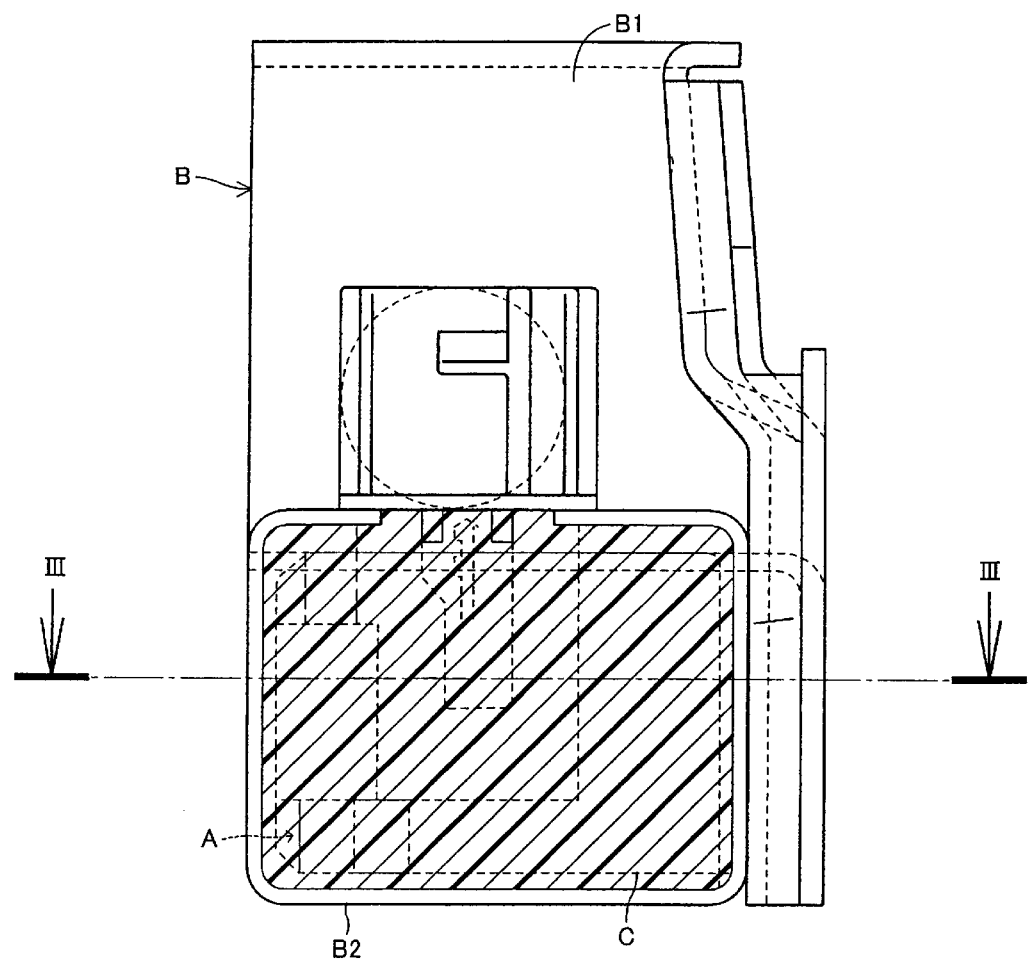
FIG. 2 is a rear view of the acceleration detector and the bracket shown in FIG. 1.
Figure 3:
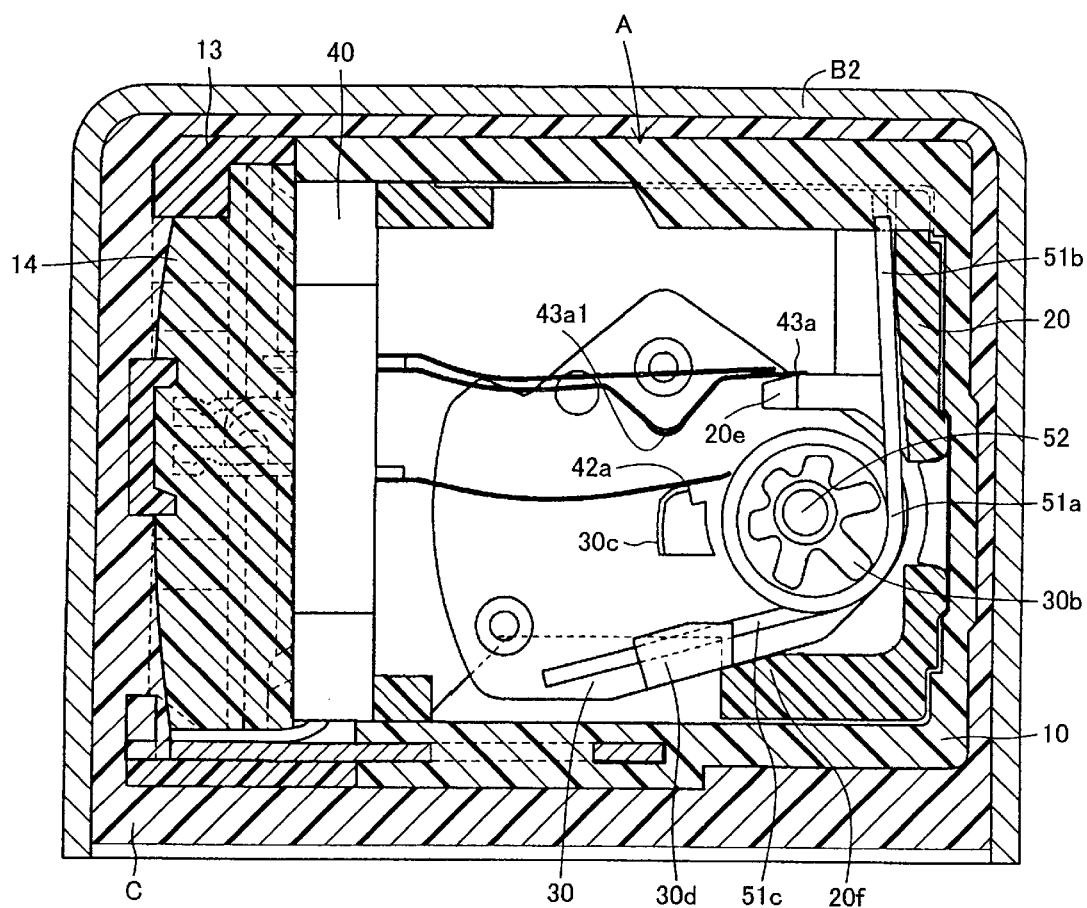
FIG. 3 is an enlarged sectional view along the line—of FIG. 2.
Figure 4:
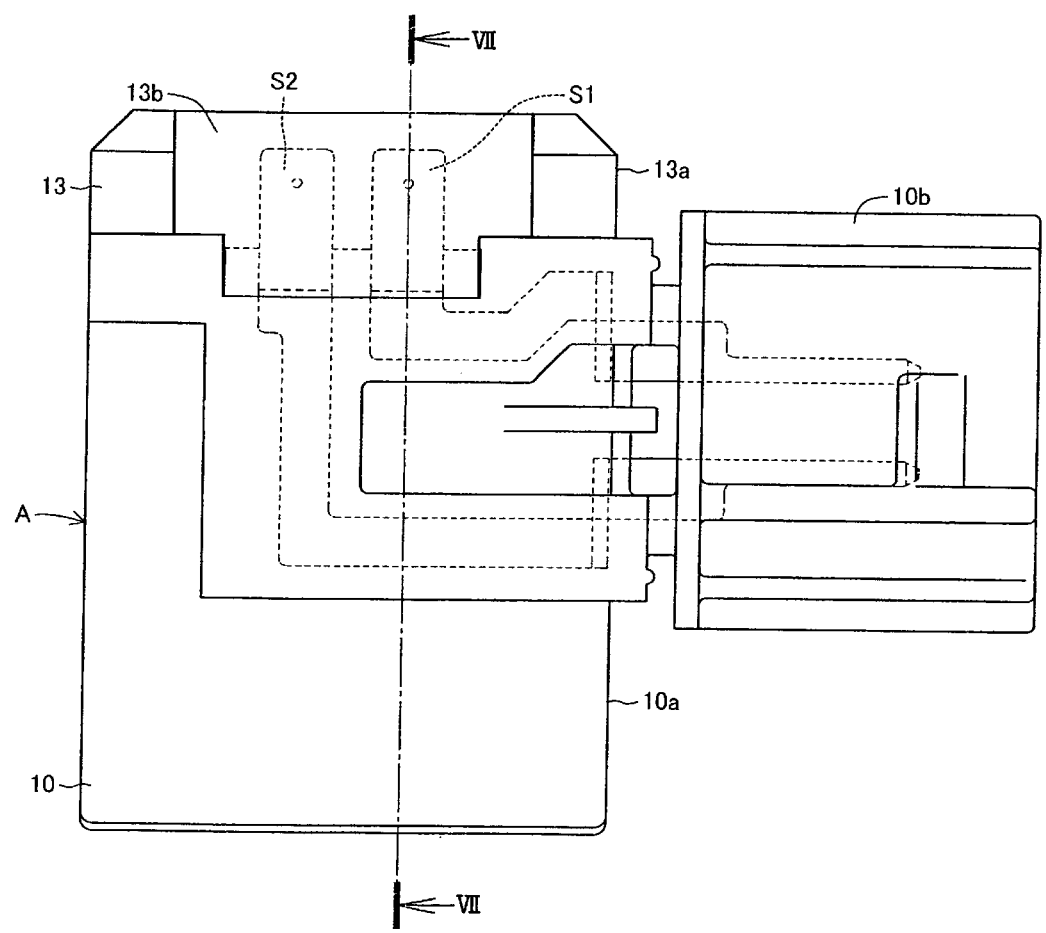
FIG. 4 is a front view of the acceleration detector shown in FIGS. 1 to 3.
Figure 5:
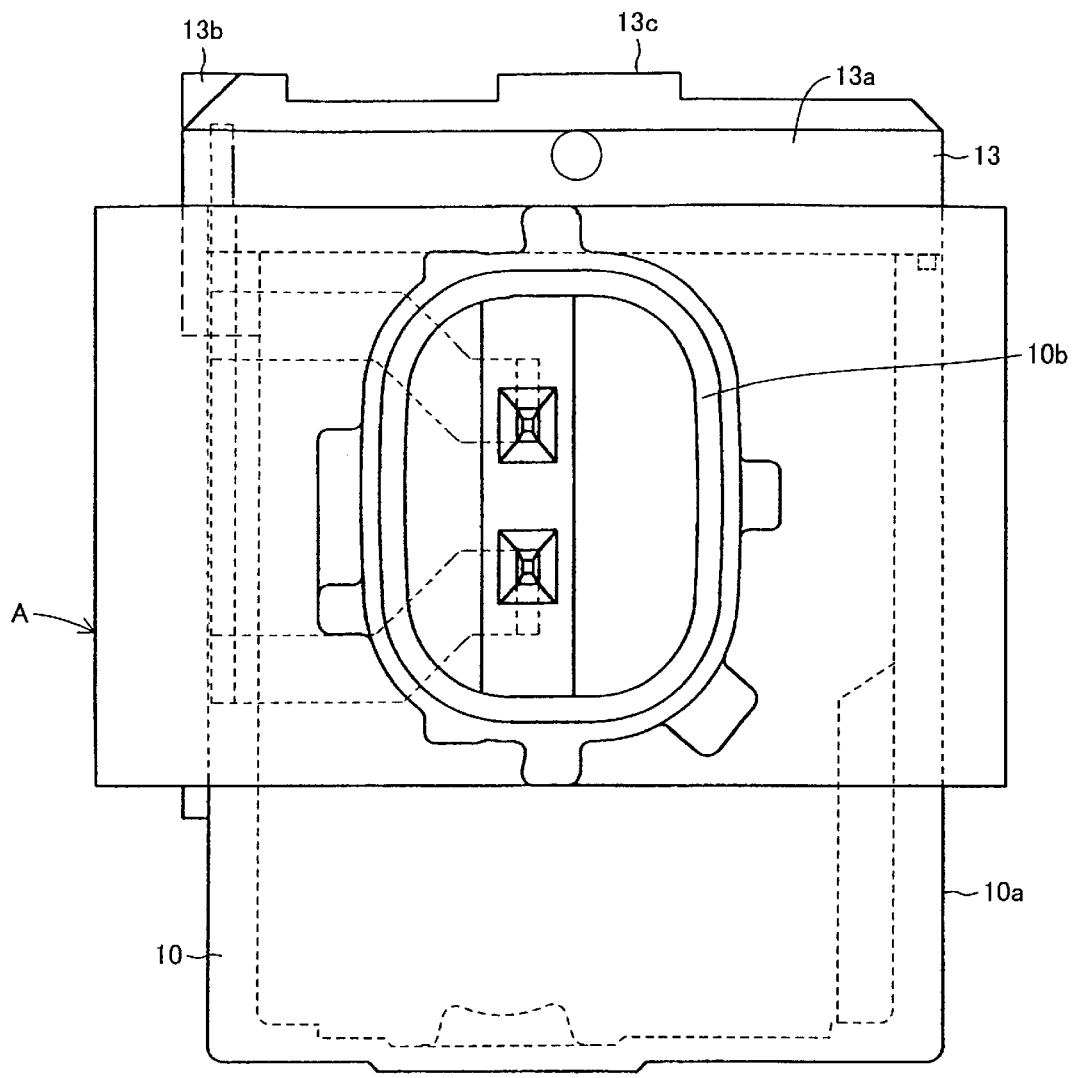
FIG. 5 is a side view of the acceleration detector shown in FIGS. 1 to 3.
Figure 6:
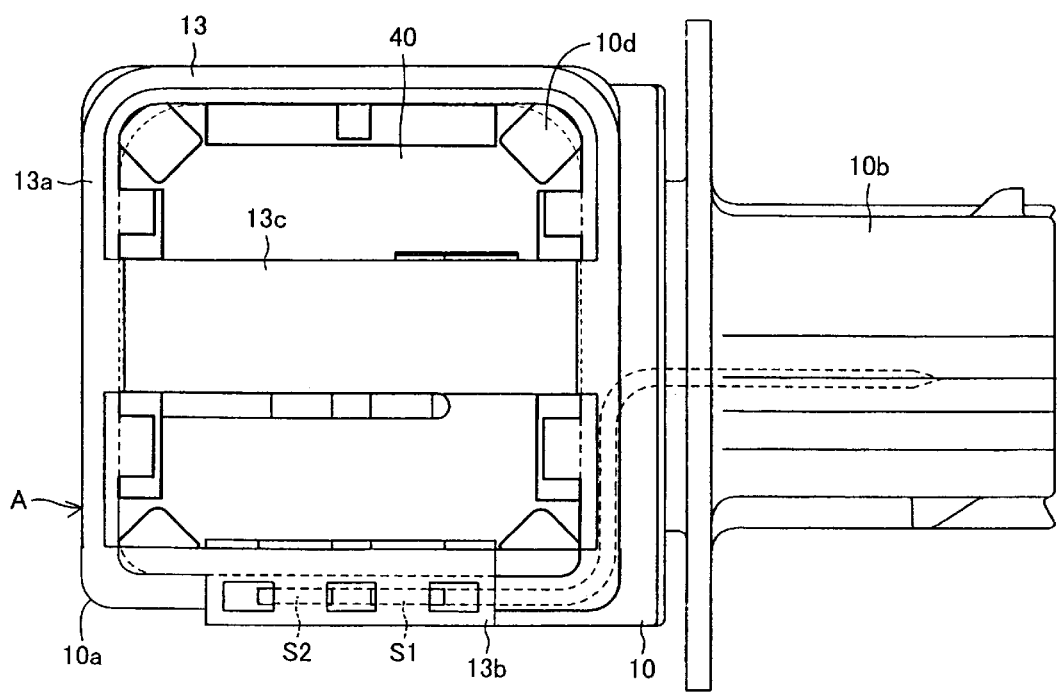
FIG. 6 is a plan view of the acceleration detector shown in FIGS. 1 to 3.

Hereinafter, an embodiment of the invention will be explained with reference to the drawings. An acceleration detector A according to the invention as shown in FIGS. 1 to 7 comprises a housing 10, a supporting case 20 enclosed in the housing 10 with a cap 13 and a seal agent 14 (see FIG. 3), a rotor 30, a switch assembly 40 and the like. As shown in FIGS. 1 to 3, the housing is to be assembled through a bracket B to a predetermined point of a vehicle body (not shown), with the direction shown by the arrow in FIG. 1 being the forward direction, in a fixed state by an injection resin C, assembled to the bracket B (see the shaded portion in FIG. 2 and the shaded portion indicating a cross-section in FIG. 3). The bracket B comprises a mounting metal fitting B1 made of metal and a metal case B2 assembled thereto by welding for accommodating the acceleration detector A. Incidentally, FIGS. 4 to 7 show the acceleration detector A before the seal agent 14 is injected therein.

The housing 10 is a resin molding in which a pair of connection terminals 11,12 are formed noncontactingly by insert molding. It comprises a box-shaped casing portion 10a with one end open, a connector portion 10b, and a stopper portion 10c for a rotor. Projecting pieces 10d are formed at four corners of the end portions at the opening side of the casing portion 10a. The connection terminals 11,12 respectively have inner end portions 11a,12a to be housed within the connector portion 10b of the housing 10 as well as outer end portions 11b, 12b projecting outside of the housing.

Figure 8:
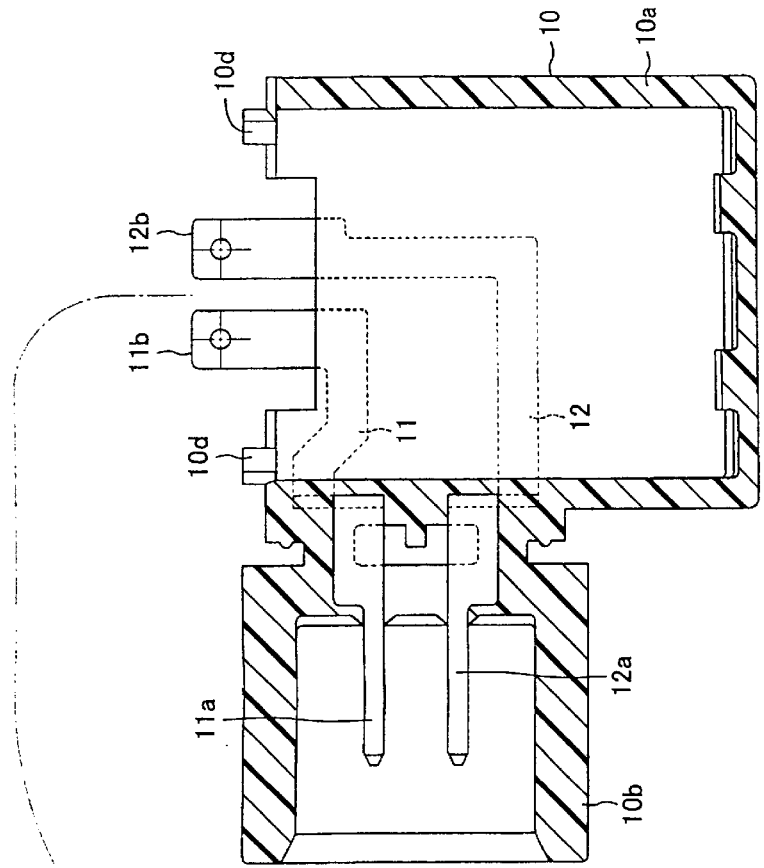
FIG. 8 is an explanatory view showing one process of the manufacturing processes of the acceleration detector shown in FIGS. 4 to 7.
Figure 8:
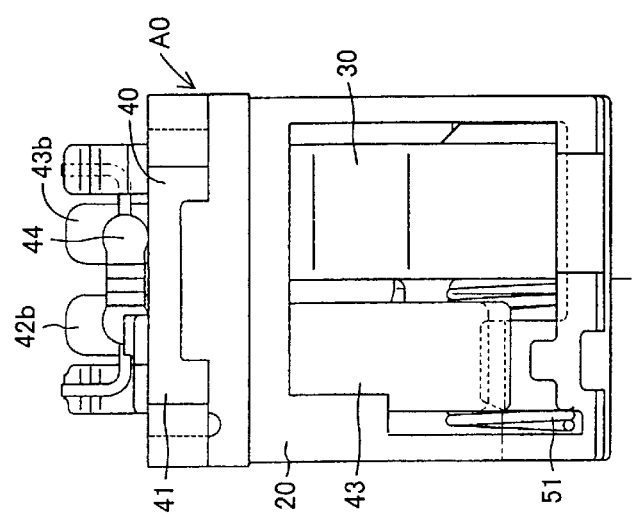
Figure 9:
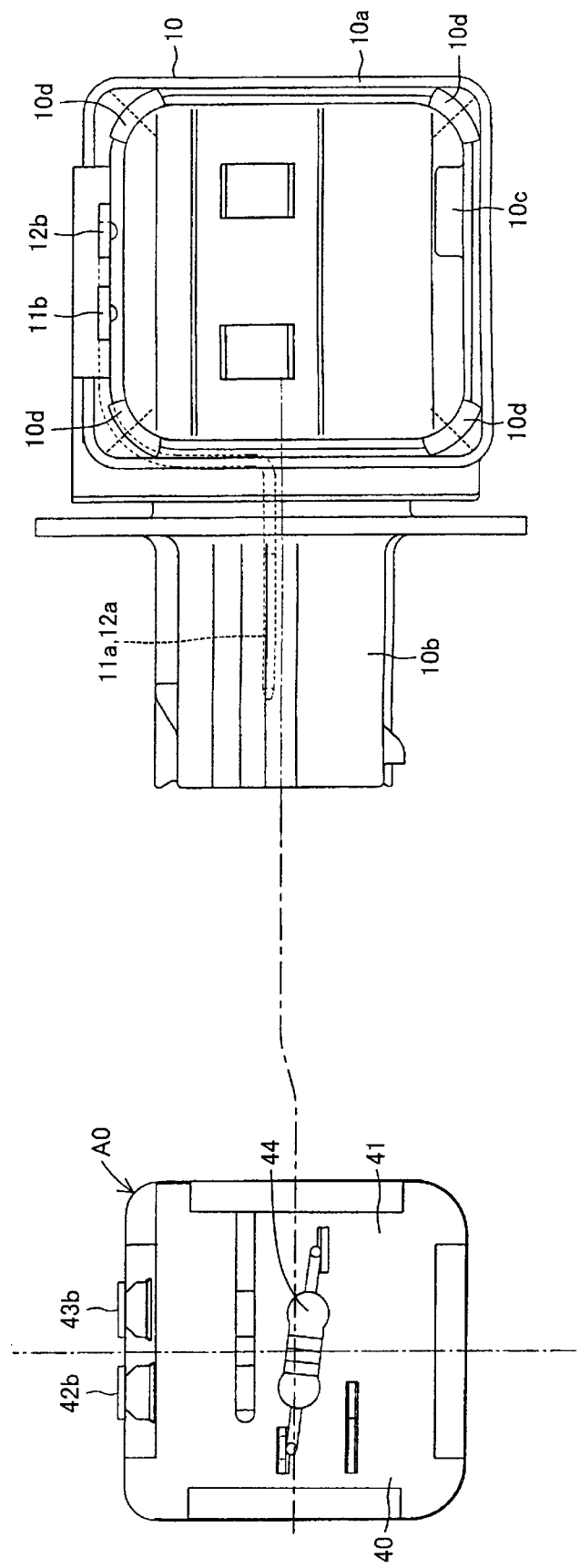
FIG. 9 is a plan view in the state shown in FIG. 8.
Figure 10:
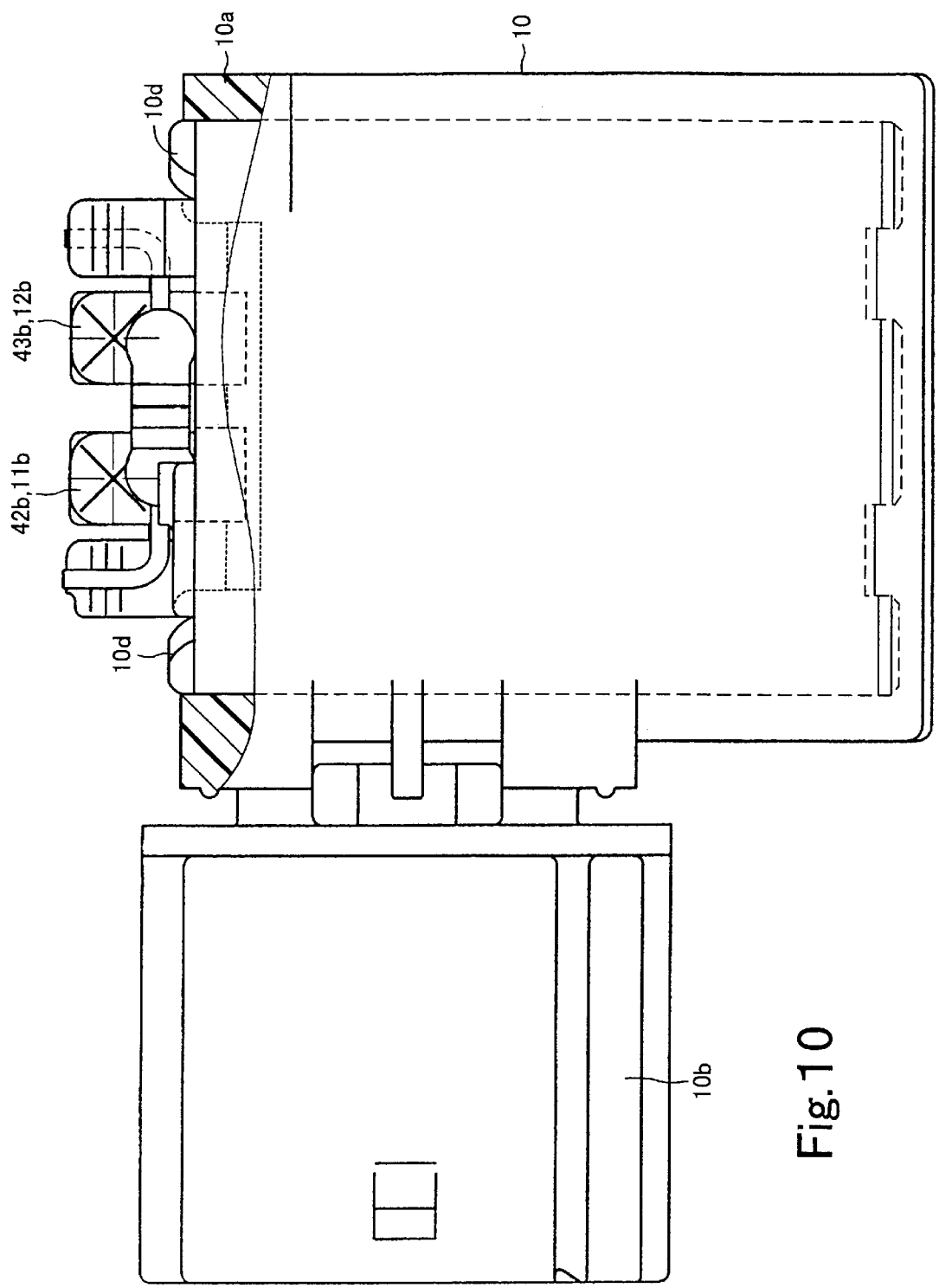
FIG. 10 is a partially cut-away view showing a manufacturing process after the manufacturing process shown in FIGS. 8 and 9.

In each of the projecting pieces 10d, the supporting case 20, the rotor 30, the switch assembly 40 and the like are, as shown in FIG. 10, pressed into the casing portion 10a of the housing 10 from the state as shown in FIGS. 8 and 9. The outer end portions 11b,12b of each connection terminal 11,12, and outer end portions 42b,43b projecting outside of the housing of each contact terminal 42,43 as mentioned later, are respectively connected by welding at the cross-marked portion in FIG. 10 so as to carry current and then by heat caulking. The projecting pieces prevent the supporting case 20, the rotor 30, the switch assembly 40 and the like from falling out.

The cap 13 is, as shown in FIGS. 4 to 7, fitted in a nd fixed to the open end portion of the casing portion 10a after each projecting piece 10d in the housing 10 is caulked. The cap 13, formed of a transparent insulating resin material such as polycarbonate, includes an enveloping portion 13a enveloping the opening end portion of the casing portion 50a, a coating portion 13b coating both terminal connecting portions S1,S2 (the outer end portions 11b,12b and the outer end portions 42b,43b) connected by welding each connection terminal 11,12 to each contact terminal 42,43, and a bridge portion 13c coating a resister 44 for a monitor as described later. The seal agent 14 is an adhesive agent of UV hardening-type and a predetermined amount thereof is injected in the cap 13 assembled to the housing 10 so that a current-carrying portion, i.e., both terminal connecting portions S1,S2, the resister 44 for the monitor and the connecting portion thereof, within the cap 13 is embedded and a closing portion of the casing portion 10a closed by th e switch assembly 40 is sealed.

Figure 7:
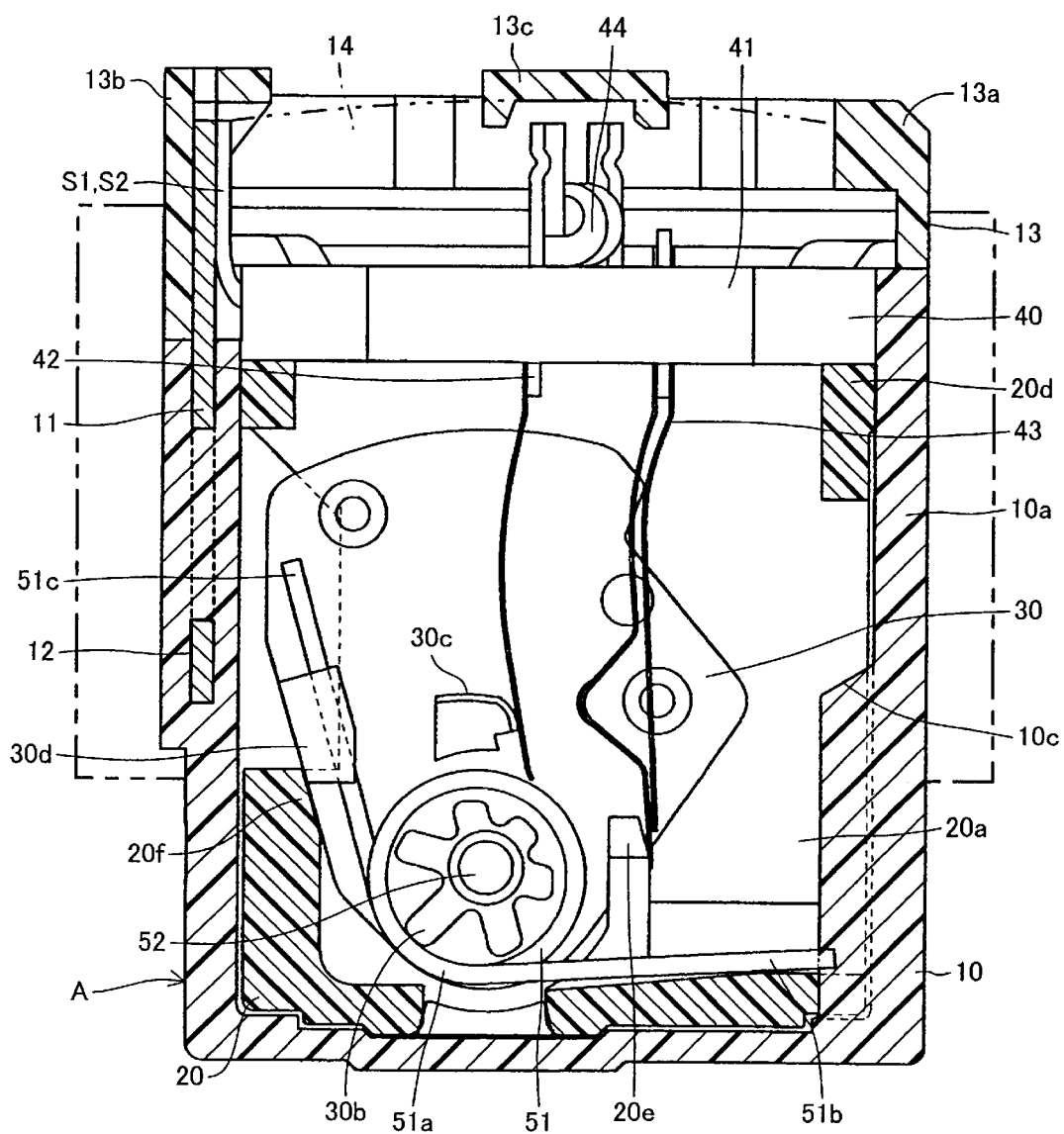
FIG. 7 is a sectional view along the line—of FIG. 4.
Figure 11:
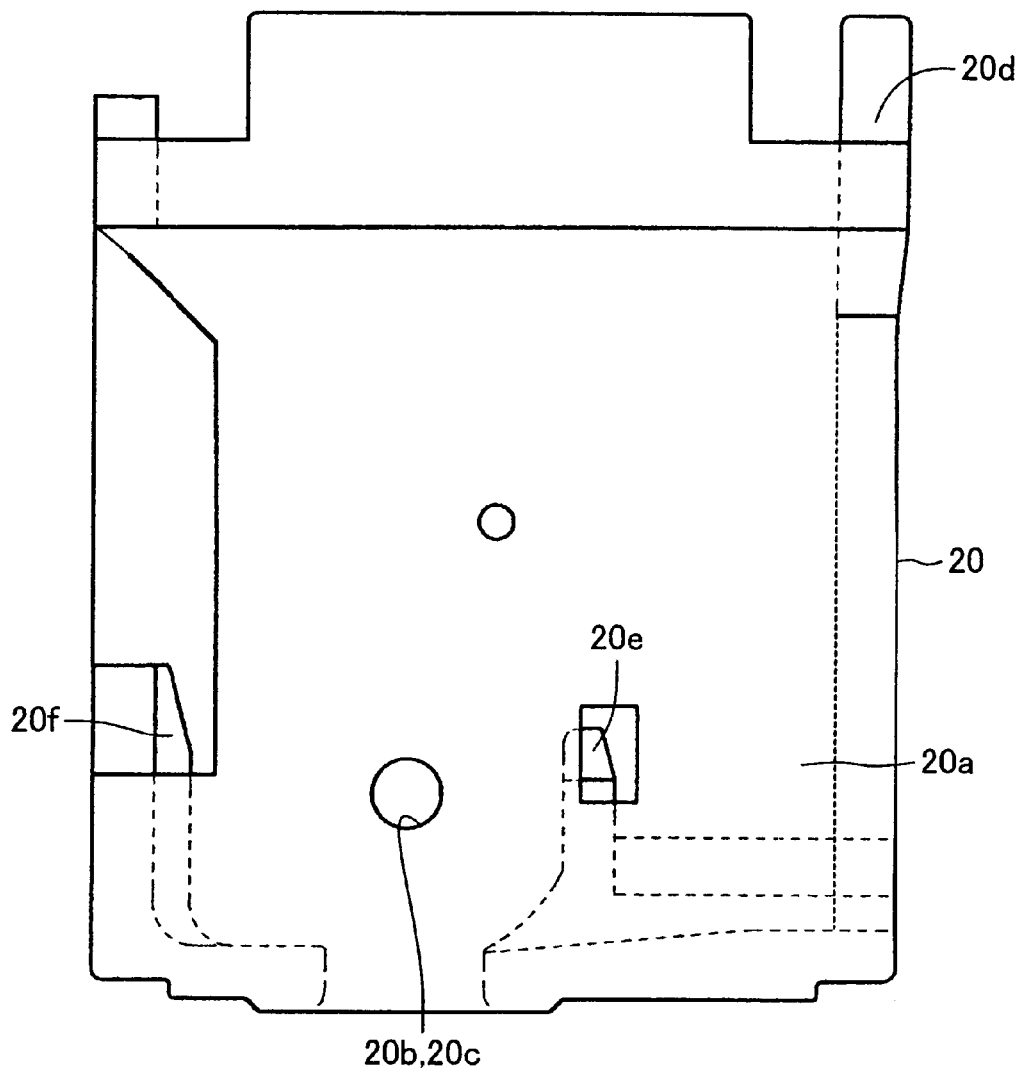
FIG. 11 is a front view showing a supporting case unit of the acceleration detector shown in FIGS. 4 to 7.
Figure 12:
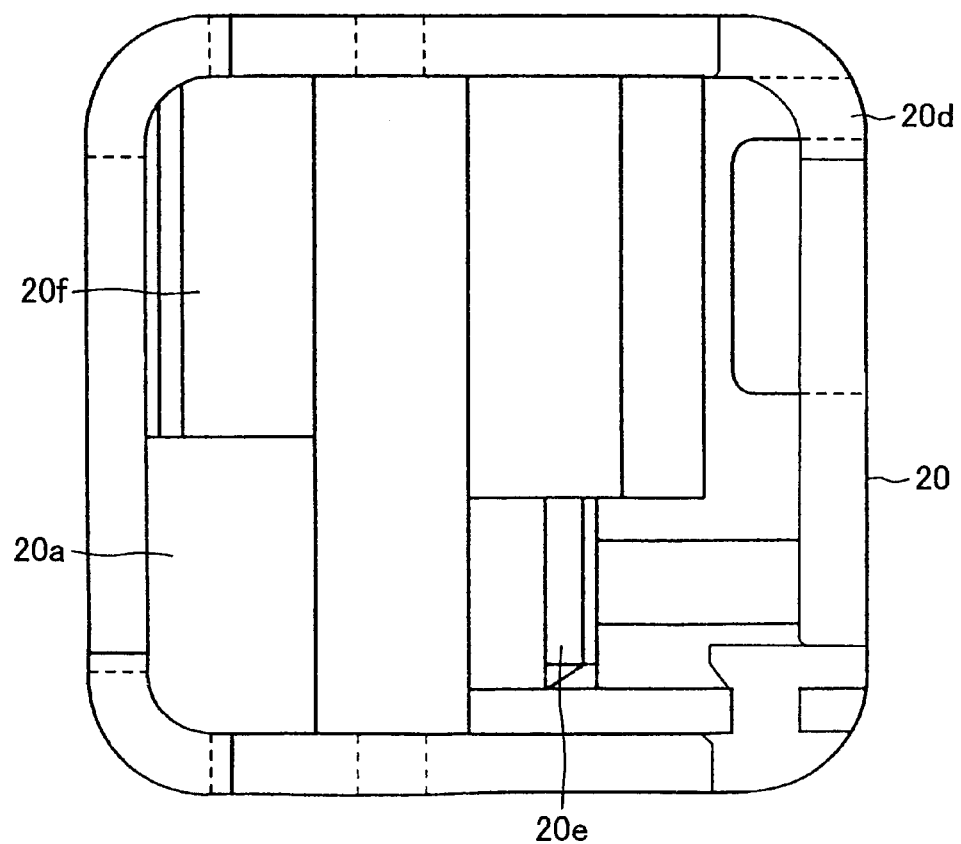
FIG. 12 is a plan view of the supporting case unit shown in FIG. 11.

As shown in FIGS. 7, 11, and 12, the supporting case 20 is a resin molded product for assembling the rotor 30 together with the coil-like torsion spring 51 by the shaft 52, and for directly assembling the switch assembly 40. The supporting case 20 has a casing portion 20a for casing the rotor 30, the torsion spring 51 and the like, supporting throughout holes 20b,20c of the shaft 52, the mounting portion 20d of the switch assembly 40, a stopper portion 20e for contact, and a stopper portion 20f for the rotor and the like.

Figure 13:
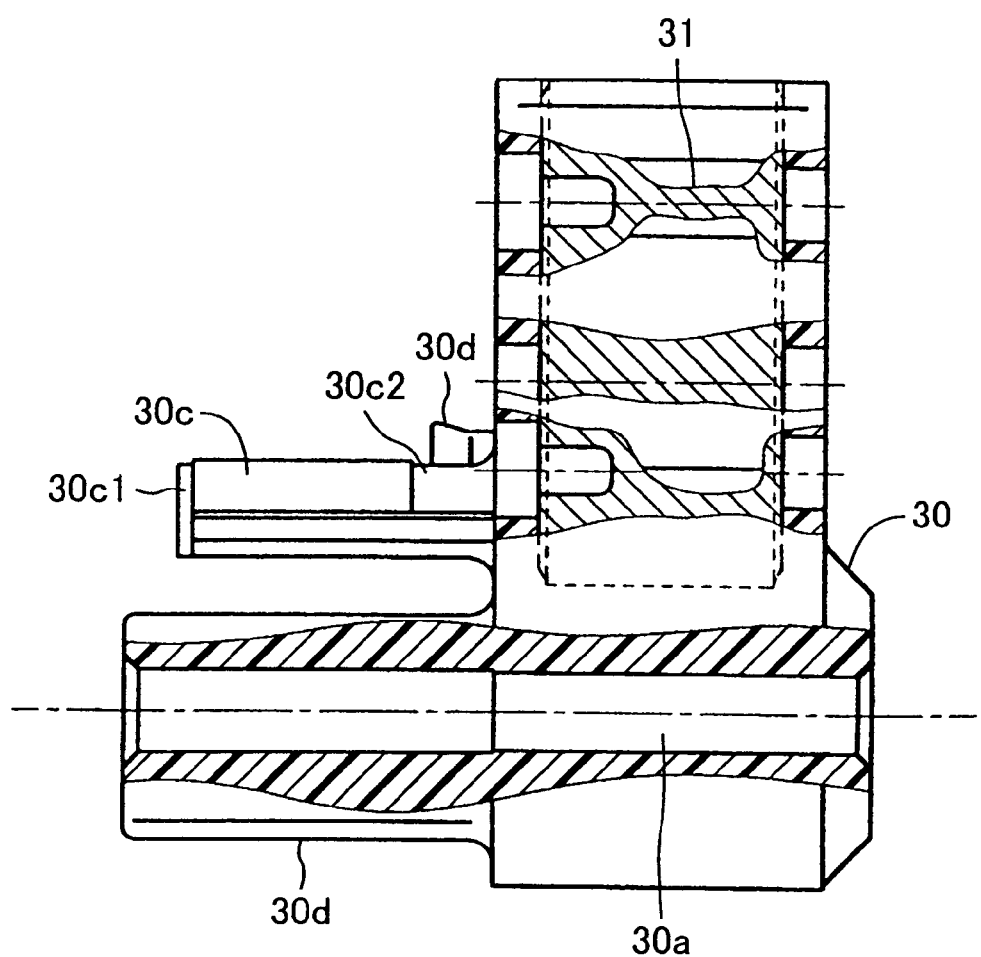
FIG. 13 is a partly cut-away front view showing a rotor unit of the acceleration detector shown in FIGS. 4 to 7.
Figure 14:
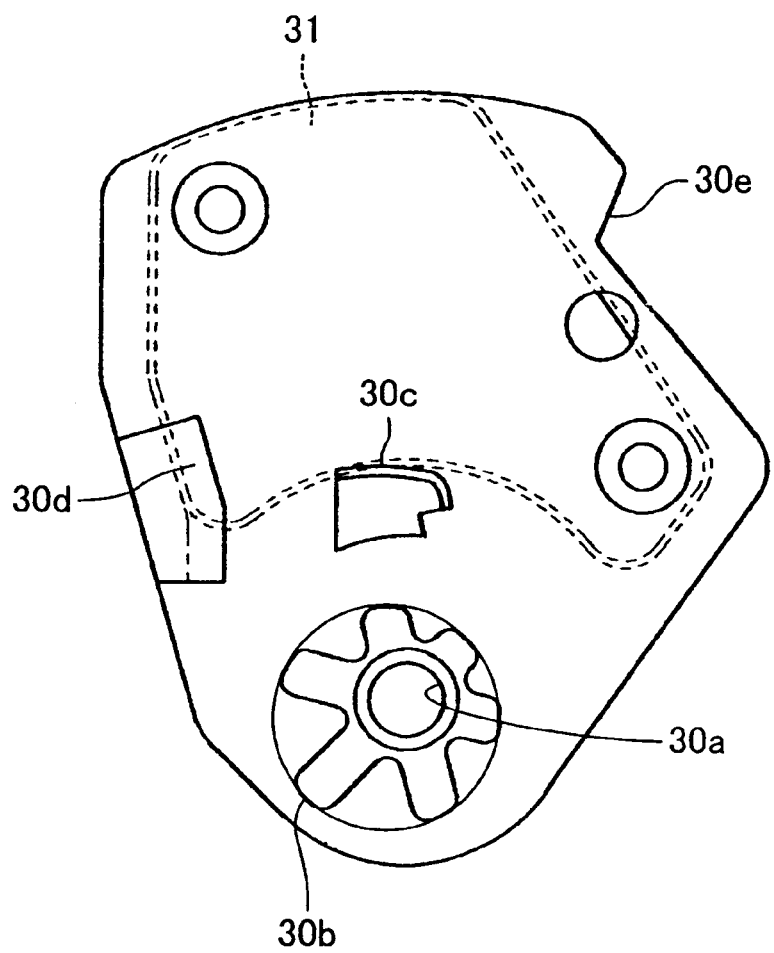
FIG. 14 is a side view of the rotor unit shown in FIG. 13.
Figure 15:
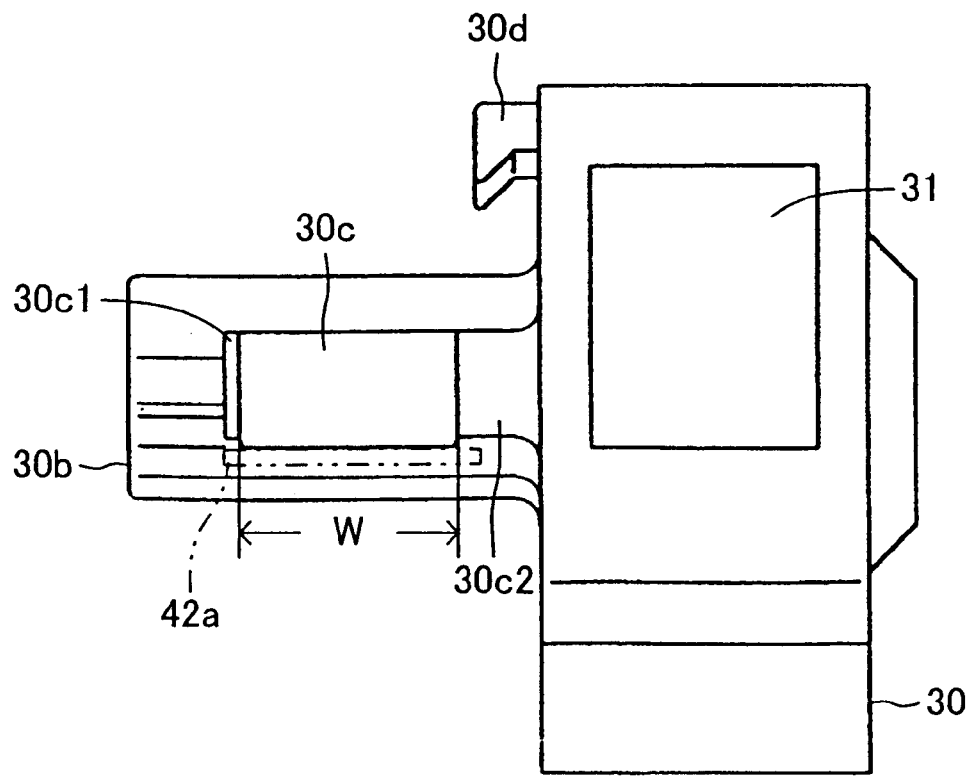
FIG. 15 is a plan view of the rotor unit shown in FIG. 13.

As shown in FIGS. 13 to 15, the rotor 30, which is a resin molded product by insert molding at a position where a weight 31 made of a sintered metal is displaced from the rotary center by a predetermined amount, has a shaft insertion hole 30a, a spring supporting portion 30b, a contact engagement cam portion 30c, a spring engagement portion 30d and a stopper portion 30e. The rotor 30 is rotatably assembled to the shaft 52 to be fixed to the supporting case 20 by inserting the shaft 52 into the supporting throughout holes 20b,20c of the supporting case 20 and the shaft insertion hole 30a of the rotor 30 and the like, in a state incorporated within the supporting case 20 together with the torsion spring 51 assembled in advance to the spring supporting portion 30b.

Moreover, as shown in FIG. 7, the rotor 30 is rotatable in a range from the initial position at a rotary angle of 0° in contact with the stopper portion 20f for the rotor of the supporting case 20 to the maximum rotary position at a rotary angle of 40° where the stopper portion 30e is in contact with the stopper portion 10c for the rotor of the housing 10 in an assembled state to the housing 10. The stopper portion 30e of the rotor 30 and the stopper portion 10c for the rotor of the housing 10, having a stopper surface extending in the radial direction with respect to the rotary center of the rotor 30, contact with each other at substantially right angles with respect to the rotary direction of the rotor 30.

The shaft insertion hole 30a of the rotor 30 is formed with a portion corresponding to the spring supporting portion 30b (substantially the left half of FIG. 13) being slightly larger in diameter so as not to press in contact with the shaft 52 even if the spring supporting portion 30b is pressed and moved in the radial direction by reaction force of the torsion spring 51. The contact engagement cam portion 30c of the rotor 30 is formed to have a predetermined width W (see FIG. 15) and with steps or escapes 30c 1,30c 2 at both sides.

As shown in FIGS. 3 and 7, the torsion spring 51, assembled to the spring supporting portion 30b of the rotor 30 by a helical portion 51a, has an one end 51b latched to the supporting case 20 and the other end 51c latched to the spring latch portion 30d of the rotor 30, urging the rotor 30 in the counterclockwise direction in FIGS. 3 and 7. The torsion spring is in contact with the stopper portion 20f for the rotor of the supporting case 20 at the regular time. The spring supporting portion 30b of the rotor 30 is displaced or off-set by a predetermined amount in a predetermined direction with respect to the axis center of the shaft 52, the rotary center of the rotor 30, as shown in FIGS. 7 and 13. Moreover, the axis center of the helical portion 51a (the spring effect center of the torsion spring 51) is set to substantially correspond to the rotary center of the rotor 30 even in a case where the rotor 30 is rotated from the state shown in FIG. 7 in the clockwise direction and torque is exerted on the torsion spring 51.

Figure 16:
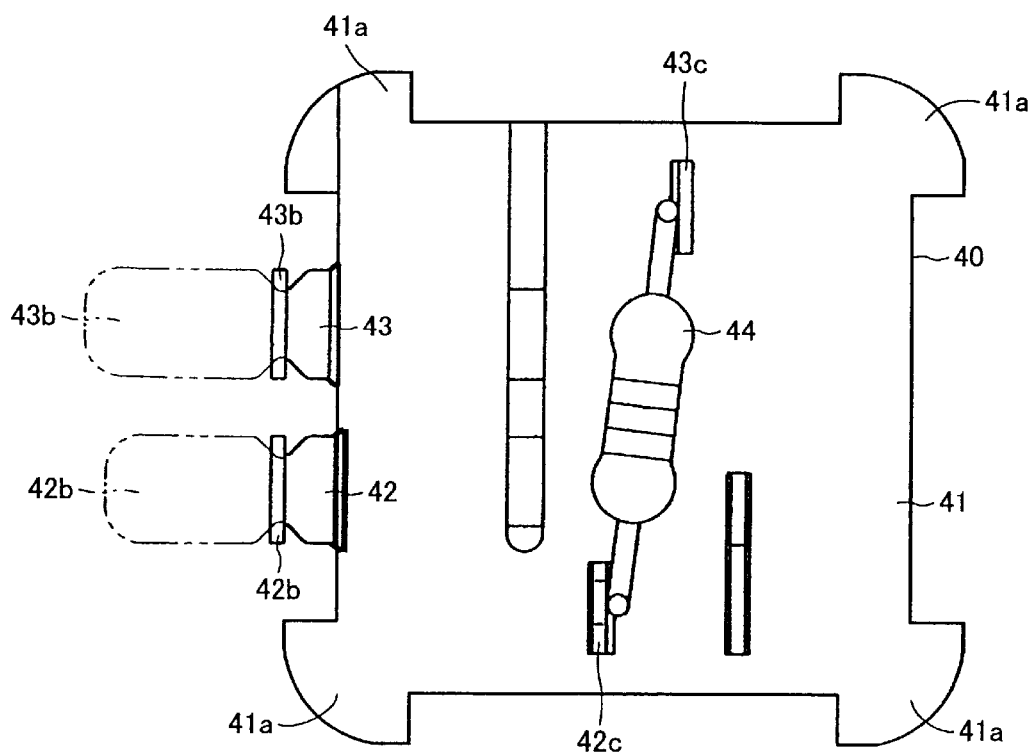
FIG. 16 is a plan view showing a switch assembly of the acceleration detector shown in FIGS. 4 to 7.
Figure 17:
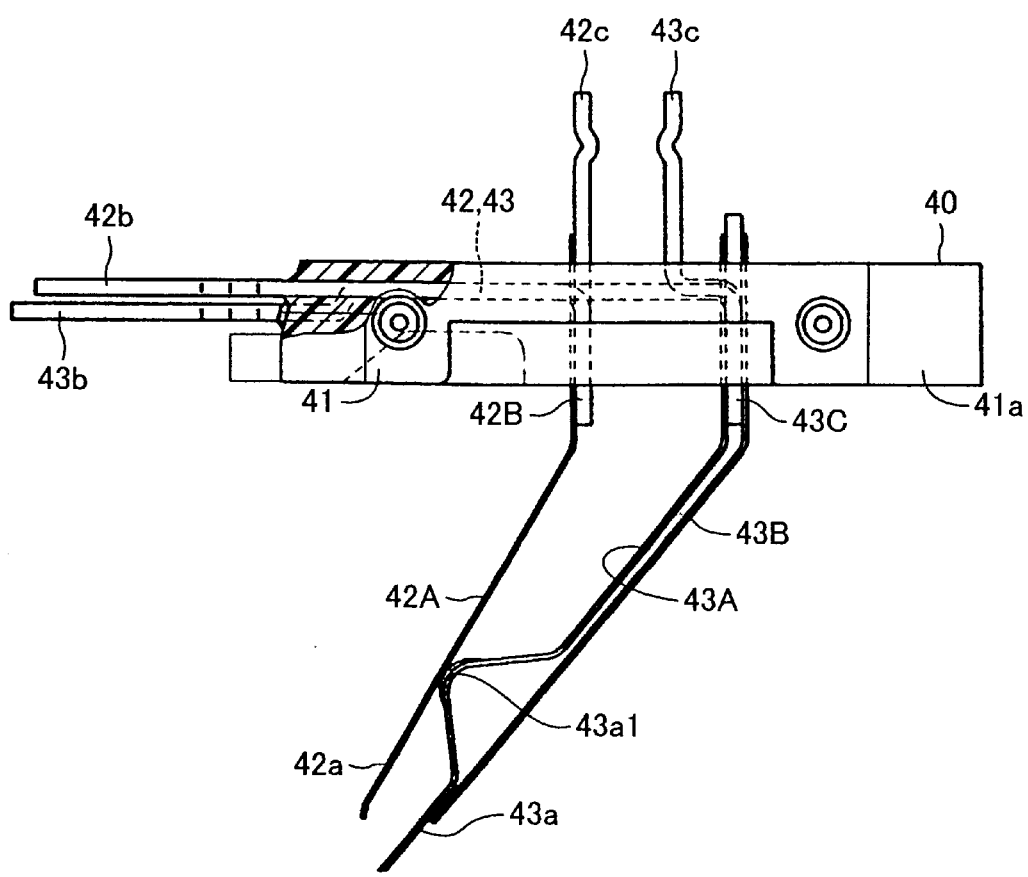
FIG. 17 is a partly cut-away side view of the switch assembly before a resister for monitor is mounted shown in FIG. 16.
Figure 18:
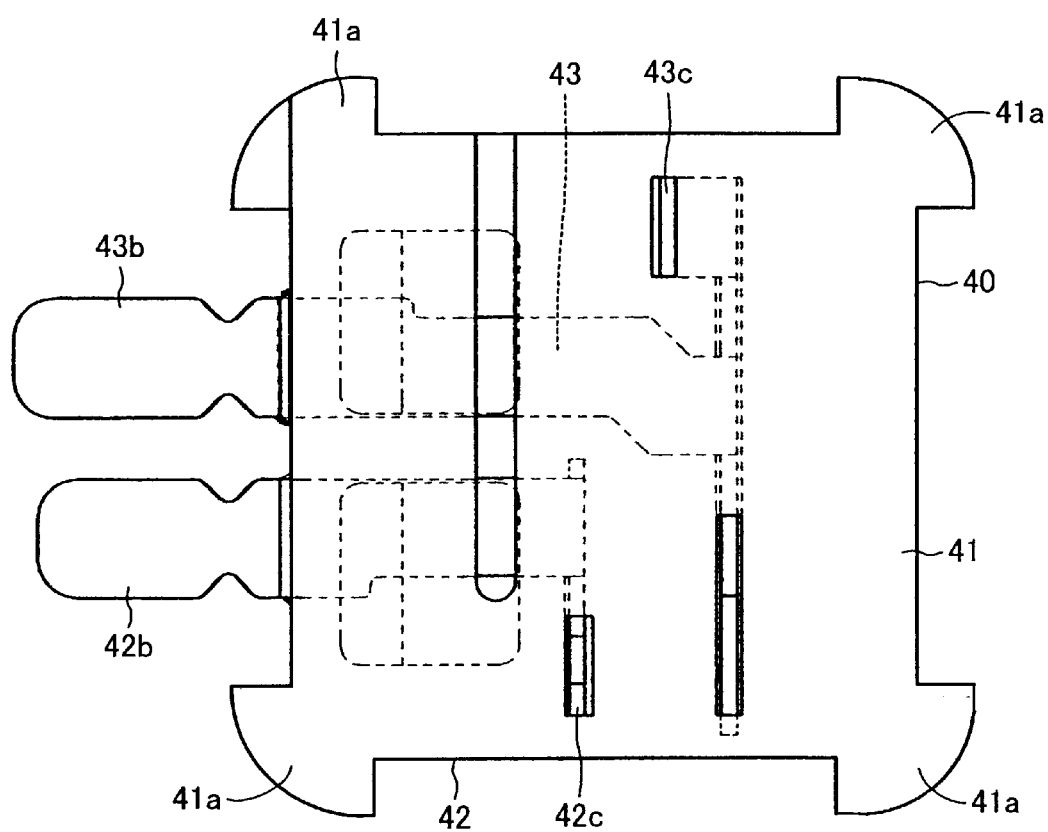
FIG. 18 is a plan view of the switch assembly shown in FIG. 17.

The switch assembly 40 comprises a base 41 made of resin by noncontacting insert molding of the paired contact terminals 42,43, and a resister 44 for a monitor connected to second outer end portions 42c,43c as described later of the contact terminals 42,43 so as to carry current by welding at one side of the base 41 outside the housing 10, as shown in FIGS. 16 to 18. The base 41 is formed in a substantially rectangle-shape with a substantially sector-shaped mounting portions 41a to be fitted in and fixed to the mounting portions 20d of the supporting case 20 at four corners.

One of the contact terminals 42 comprises a rear contact 42A including an elastically deformable plate spring and a thick lead piece 42B as shown in FIGS. 17 and 18, integrated in advance by welding at a portion to be resin-molded before insert molding. The contact terminal has an inner end portion 42a elastically, repulsively and slidably engaged with a contact engagement cam portion 30c of the rotor 30 as well as a first outer end portion 42b and a second outer end portion 42c projecting outside, which are arranged in the assembled state as shown in FIG. 7.

The inner end portion 42a of the contact terminal 42 is formed to have a slightly larger width than the width W of the contact engagement cam portion 30c as shown by the imaginary line of FIG. 15 so that the edges at both sides (both right and left ends of FIG. 15) are not engaged with the contact engagement cam portion 30c. Moreover, the inner end portion 42a is assembled as shown in FIGS. 3 and 7 so as to be elastically deformed when being pressed and moved by the contact engagement cam portion 30c by rotation of the rotor 30 in the clockwise direction of FIG. 3 and elastically and repulsively come in contact with a projection 43a1 formed at the inner end portion 43a of the other contact terminal 43 by rotation of the rotor 30 by a predetermined amount (at a rotary angle of 15°).

The other contact terminal 43 comprises a pair of front contacts 43A,43B comprising an elastically deformable plate spring and a thick lead piece 43C as shown in FIG. 17 and FIG. 18, integrated in advance by welding at a part to be resin-molded before insert molding. The contact terminal has an inner end portion 43a elastically and repulsively engaged with a stopper portion 20e for contact of the supporting case 20 arranged within the housing 10 as well as a first outer end portion 43b and a second outer end portion 43c projecting outside, in the assembled stated as shown in FIG. 7.

The acceleration detector A of this embodiment constituted as above is assembled in a first manufacturing process of assembling the rotor 30, the torsion spring 51 and the switch assembly 40 and the like to the supporting case 20 to make a subassembly Ao (see FIGS. 8 and 9) and in a second manufacturing process of assembling the subassembly Ao and the cap 13 to the housing 10 and injecting the seal agent 14.

In the first manufacturing process, first, the rotor assembled with the torsion spring 51 in advance is assembled to the supporting case 20 with the shaft 52. At this time, the rotor is assembled in such a manner that one end 51b of the torsion spring 51 and the other end 51c threof are latched to the supporting case 20 and a spring latch portion 30d, respectively. Next, the switch assembly 40 as shown in FIG. 16 is assembled by pressing in the supporting case 20 to make the subassembly Ao. At this time, it is assembled so that the inner end portion 42a of one contact terminal 42 and the inner end portion 43a of the other contact terminal 43 are elastically and repulsively engaged with the contact engagement cam portion 30c of the rotor 30 and the stopper portion 20e for contact of the supporting case 20, respectively.

Moreover, in the second manufacturing process, first, the subassembly Ao is assembled within the housing 10 by pressing as shown in FIGS. 8 and 9. Next, the first outer end portion 42b of one contact terminal 42 and the outer end portion 11b of the connection terminal 11 are connected by welding, the first outer end portion 43b of the other contact terminal 43 and the outer end portion 12b of the contact terminal 12 are connected by welding, and then each projecting piece 10d of the housing 10 is heat caulked. Next, the cap 10 is fitted in and fixed to the housing 10. Lastly, a predetermined amount of the seal agent 14 is injected to set, up to the point indicated by the imaginary line in FIG. 7, within the cap 13.

The acceleration detector A assembled as mentioned above is mounted as shown in FIGS. 1 to 3 to a predetermined point of a vehicle through the bracket B, in a state where the detector is assembled at the bracket B and fixed by the injection resin C, with the direction shown by the arrow in FIG. 1 being the forward direction. Therefore, in a state where acceleration is not exerted toward the front of the vehicle, the rotor 30 is held at the initial position as shown in FIG. 3 by urging force of the torsion spring 51, the inner end portion 42a of the one contact terminal 42 is apart from the inner end portion 43a of the other contact terminal 43, and the one contact terminal 42 and the other contact terminal 43 are in an electrically unconnected state.

In such a state, when acceleration at or more than a predetermined value is applied forward by collision of a vehicle or the like, the rotor 30 is rotated against urging force of the torsion spring 51 from the initial position, at a rotary angle of 0°, as shown in FIG. 3 to the maximum rotary position, at a rotary angle of 40°, in contact with the stopper portion 10c for the rotor of the housing 10. With the rotation, the inner end portion 42a of the one contact terminal 42 and the inner end portion 43a of the other contact terminal 43 are pressed and moved in sequence. When the rotor 30 rotates by at or more than a predetermined amount, at a rotary angle of 15°, in the rotation of the rotor 30, the inner end portion 42a of the one of the contact terminal 42 comes in contact with the inner end portion 43a of the other contact terminal 43 to be in an electrically connected state. Thereby, acceleration at or more than the predetermined value exerting forward is detected.

In the acceleration detector A of the embodiment, since the supporting portion or spring supporting portion 30b is integrally formed with the rotor 30, it is possible to reduce the costs. Moreover, the supporting portion 30b is displaced by a predetermined amount in a predetermined direction from the rotary center of the rotor 30 so that the spring effect center when torque is exerted to the torsion spring 51 by rotation of the rotor substantially corresponds to the rotary center of the rotor 30; therefore, the desired urging force, approximating the design value, of the torsion spring 51 is applied to the rotor 30 rotating and a desired performance can be obtained.

Moreover, in the acceleration detector A of the embodiment, since the width of the inner end portion 42a of the contact terminal 42 to be pressed and moved by the contact engagement cam portion 30c integrally formed with the rotor 30 is formed larger than the width W of the contact engagement cam portion 30c so that the edges at both sides of the inner end portion 42a of the contact terminal 42 are not engaged with the contact engagement cam portion 30c in the arrangement, in the engagement portion of the contact engagement cam portion 30c rotating integrally with the rotor 30 and the inner end portion 42a of the contact terminal 42, the edges at both sides of the inner end portion 42a in the contact terminal 42 in rotation of the rotor 30 do not damage the contact engagement cam portion 30c; therefore, the slide resistance between them can be stabilized to obtain a desired performance.

Moreover, in the acceleration detector A of the embodiment, contact of the stopper portion 30e of the rotor 30 with the stopper portion 10c for the rotor of the housing 10 is at substantially right angles to the rotary direction of the rotor 30; therefore, in the contact, the rotor 30 does not vibrate at the gap between the rotor 30 and the shaft 52 in the radial direction so that noise can be avoided in a detection signal.

Moreover, in the acceleration detector A of the embodiment, a single opening of the casing portion 10a in the housing 10 is closed by the base 41 of the switch assembly 40 and sealed by the seal agent 14, whereby the casing portion 10a of the housing 10 has a sealed structure; therefor, it is possible to reduce the processes for the sealed structure of the casing portion 10a of the housing 10, the costs, and possibilities to produce defects in the manufacturing processes. Moreover, since both terminal connecting portion S1,S2 which project outside the housing 10 are also sealed by the seal agent 14, the both terminal connecting portions S1,S2 can be positively protected.

Furthermore, in the embodiment, both contact terminals 42,43 have second outer end portions 42c,43c which project outside the housing 10 and the resister 44 for monitor electrically connected to these both outer end portions 42c,43c at both ends together with both outer end portions 42c,43c sealed by the seal agent 14 (see FIG. 3); therefore, it is possible to control movement of the resister 44 for monitor by the seal agent 14 and to improve anti-vibration and durability of the both end connecting portions in the resister 44 for monitor.

Also, in the embodiment, since the cap 13 assembled to the housing 10 and surrounding the seal part is used in sealing by the seal agent 14, it is possible to positively inject the seal agent 14 to a desired place, improve the workability and prevent drop and adhesion of the seal agent 14 to the surroundings. Moreover, before the cap 13 is assembled to the housing 10, the welding work to electrically connect the outer end portions 42b,43b of contact terminal 42,43 outside the housing 10, to the outer end portions 11b,12b of each connection terminal 11,12, respectively, can be carried out in a state where the surroundings of both terminal connecting potions S1,S2 are open; therefore, the workability of the connecting is good.

Moreover, since the cap 13 formed of an insulating resin material has a coating portion 13b to coat both terminal connecting portions S1,S2, each connecting portion of the outer end portions 42b,43b of both-contact terminals 42,43 and the outer end portions 11b,12b of the both connection terminals 11,12 is insulation-coated by the coating portion 13b of the cap 13 to positively prevent short-circuit of each terminal connecting portion S1,S2 and a metal case B2 in case excessive external force is applied in the acceleration detector A during use and causes deformation.

In the above-mentioned embodiment, the cap 13 is used in sealing by the seal agent 14; however, it can be carried out without the cap 13. Moreover, although the accelerating detector A having the resister 44 for monitor is carried out in the embodiment, an acceleration detector without the resister for monitor is similarly practicable. Moreover, the supporting case 20 is employed and the rotor 30, the torsion spring 51 and the switch assembly 40 and the like are assembled to the housing 10 in the embodiment; however, it is possible to assemble the rotor 30, the torsion spring 51 and the switch assembly 40 and the like to the housing 10 by employing a different constitution from the supporting case 20, for example, a supporting portion integrally formed with the housing 10.

What is claimed is:

1. An acceleration detector comprising;
   a rotor rotatably supported within a housing and rotatable against an urging force of a torsion spring according to acceleration,
   a pair of contact terminals contactable with each other to be in an electrically connected state by rotation of the rotor at an inner end portion provided within the housing, and
   a supporting portion integrally formed with the rotor and supporting the torsion spring, a center of the supporting portion being displaced by a predetermined amount in a predetermined direction from a rotary center of the rotor, with a center of a spiral portion of the torsion spring when torque is exerted on the torsion spring by rotation of the rotor substantially corresponds to the rotary center of the rotor.

2. The acceleration detector according to claim 1, wherein the supporting portion projects at one side of the rotor and is provided with an insertion hole in which is positioned a shaft rotatably supporting the rotor at a portion displaced by a predetermined amount from the center of the supporting portion.

3. The acceleration detector according to claim 2, wherein the insertion hole includes a hole portion extending throughout the supporting portion that is slightly larger in diameter than another portion extending throughout the rotor.

4. The acceleration detector according to claim 2, wherein the supporting portion comprises a plurality of projections extending in the radial direction.

5. The acceleration detector according to claim 2, wherein a cam portion to press and move the contact terminals is formed at a side of the rotor where the supporting portion is formed.

6. The acceleration detector according to claim 1, wherein the torsion spring has the spiral portion assembled to the supporting portion of the rotor, one end portion supported on the housing side and the other end portion supported on the rotor.

7. The acceleration detector according to claim 1, wherein one of the inner end portions of the pair of contact terminals is movably pressed by a cam portion integrally formed with the rotor, the contact terminals being arranged with the inner end portion of the contact terminals to be pressed and moved by the cam portion being larger in width with respect to an axial direction of the rotor than the cam portion so that edges at both sides of the inner end portion of the contact terminals with respect to the axial direction of the rotor are arranged so as not to be in contact with the cam portion.

8. An acceleration detector comprising:
   a rotor rotatably supported within a housing and rotatable according to acceleration, and
   a pair of contact terminals contactable with each other to be in an electrically connected state by being pressed and moved by a cam portion which integrally rotates with the rotor at an inner end portion provided with the housing,
   wherein the contact terminals are arranged with the inner end portion of the contact terminals pressed and moved by the cam portion being formed larger in width with respect to an axial direction of the rotor than the cam portion so that edges at both sides of the inner end portion of the contact terminals with respect to the axial direction of the rotor are arranged so as not to be in contact with the cam portion.

9. The acceleration detector according to claim 8, wherein steps are formed at both sides of the cam portion with respect to an axial direction of the rotor.

* * * * *

UNITED STATES PATENT AND TRADEMARK OFFICE
CERTIFICATE OF CORRECTION

PATENT NO. : 6,528,747 B2
DATED : March 4, 2003
INVENTOR(S) : Kazunori Sakamoto et al.

It is certified that error appears in the above-identified patent and that said Letters Patent is hereby corrected as shown below:

<u>Title page</u>,
Item [73], Assignee, add -- Toyota Jidosha Kabushiki Kaisha, Tokyoto (JP) --

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,528,747 B2
DATED : March 4, 2003
INVENTOR(S) : Kazunori Sakamoto et al.

It is certified that error appears in the above-identified patent and that said Letters Patent is hereby corrected as shown below:

<u>Title page,</u>
Item [73], Assignee, add -- Toyota Jidosha Kabushiki Kaisha, Toyoto (JP) --.

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,528,747 B2  
DATED : March 4, 2003  
INVENTOR(S) : Kazunori Sakamoto et al.

It is certified that error appears in the above-identified patent and that said Letters Patent is hereby corrected as shown below:

<u>Title page,</u>
Item [73], Assignee, change "Toyoto" to -- Toyota --.

Signed and Sealed this

Thirteenth Day of June, 2006

JON W. DUDAS
*Director of the United States Patent and Trademark Office*